(12) United States Patent
Hawn

(10) Patent No.: US 6,889,467 B2
(45) Date of Patent: May 10, 2005

(54) CARBON FIBER OUTRIGGER

(76) Inventor: Edwin Hawn, 101 N. Shoreline #204, Corpus Christi, TX (US) 78401

( * ) Notice: Subject to any disclaimer, the term of this patent is extended or adjusted under 35 U.S.C. 154(b) by 70 days.

(21) Appl. No.: 10/355,879

(22) Filed: Jan. 31, 2003

(65) Prior Publication Data

US 2004/0148844 A1 Aug. 5, 2004

(51) Int. Cl.$^7$ ............................................. A01K 91/00
(52) U.S. Cl. ........................................................ 43/27.4
(58) Field of Search ................................ 43/27.4, 21.2; 44/255

(56) References Cited

U.S. PATENT DOCUMENTS

| | | | | |
|---|---|---|---|---|
| 3,484,978 A | * | 12/1969 | Nakashima | .................... 43/17 |
| 3,802,112 A | * | 4/1974 | Banner | ....................... 43/21.2 |
| 3,866,558 A | * | 2/1975 | Bergstrom et al. | ............ 114/90 |
| 4,016,823 A | * | 4/1977 | Davis | ............................ 114/90 |
| 4,620,454 A | * | 11/1986 | Sugiuchi et al. | .............. 74/567 |
| 4,627,374 A | * | 12/1986 | Wright | ........................ 114/218 |
| 4,813,171 A | * | 3/1989 | Cooper et al. | ............... 43/27.4 |
| 4,868,038 A | * | 9/1989 | McCullough et al. | ........ 428/222 |
| 4,883,453 A | * | 11/1989 | Berry et al. | ................... 600/36 |
| 5,010,932 A | * | 4/1991 | Brinz | ....................... 114/39.16 |
| 5,044,419 A | * | 9/1991 | Ware | ............................ 164/34 |
| 5,083,395 A | * | 1/1992 | Daniels | ....................... 43/27.4 |
| 5,140,928 A | * | 8/1992 | Frick | ........................... 114/255 |
| 5,191,852 A | * | 3/1993 | Rupp | .......................... 114/255 |
| 5,243,927 A | * | 9/1993 | Messick | ...................... 114/255 |
| 5,318,374 A | * | 6/1994 | Rumberger | .................. 403/277 |
| 5,597,169 A | * | 1/1997 | Bradbury | .................... 280/276 |
| 5,921,196 A | * | 7/1999 | Slatter | ......................... 114/255 |
| 6,004,900 A | * | 12/1999 | O'Brien, III | ................. 503/227 |
| 6,049,982 A | * | 4/2000 | Tseng | ......................... 29/897.2 |
| 6,073,568 A | * | 6/2000 | Finley | ........................ 114/61.1 |
| 6,308,649 B1 | * | 10/2001 | Gedeon | .................... 114/39.11 |
| 6,383,100 B2 | * | 5/2002 | Pitsenberger et al. | ........ 473/566 |

* cited by examiner

Primary Examiner—Michael J. Carone
Assistant Examiner—Jordan Lofdahl
(74) Attorney, Agent, or Firm—McHale & Slavin, P.A.

(57) ABSTRACT

The instant invention proposes to utilize a multi-ply composite tubular structure of fibers and a polymer matrix to construct superior outriggers that do not require cable truss systems for support. By utilizing the aforementioned materials, the thickness and flex characteristics of the outrigger can be tailored and controlled. The combination of utilizing a non-circular cross section, an ellipse for example, allows the bending stiffness in the fore-aft and lateral planes to be tailored individually for optimum outrigger performance. The separate control of the bi-directional bending properties will allow a much higher control of fishing baits during trolling.

13 Claims, 13 Drawing Sheets

CARBON FIBER OUTRIGGER

FIELD OF THE INVENTION

This invention relates to the field of fishing and more particularly to a multi-ply composite tubular outrigger for use on fishing boats.

BACKGROUND OF THE INVENTION

In sportfishing operations, a conventional procedure is to troll fishing lines astern of the fishing boat from outrigger devices that hold the lines sufficiently spaced apart to prevent the lines from becoming entangled with one another while allowing the vessel to cover larger areas of water.

Outriggers in the trolling position allow more than one bait to be effectively attached to each outrigger without the danger of entanglement. To position multiple lines along the beam of an outrigger, the fishing pole line is secured to release clips attached to a positioning line that is drawn along the length of the outrigger pole to a desired location. When a fish strikes the bait, the release clip disengages the fishing line from the positioning line, and the fisherman is free to reel in the fish without interference. Proper placement of the outrigger pole and fishing line increases the chances of fish being drawn to the bait.

On large offshore sportfishing boats, the outrigger devices are typically of the tubular, cable trussed, mast type having the inboard end pivotally secured to a portion of the boat. A plurality of boom elements enable the outrigger to be held either in a stowage or trolling position while permitting movement between the two positions.

Typically, each outrigger device includes an elongated tubular structure, e.g. 10–40 feet long, having its inboard end fastened to the boat in a manner that allows the outboard or distal end to be moved from a stowage position to a fishing position. In order to minimize weight, outrigger poles are generally constructed from aluminum tubing. On smaller boats, an outrigger system can be a simple pole that carries the rigging halyard. However, on larger boats the outriggers can be as long as 40 feet; a simple aluminum pole of this length would bend and/or buckle under the loads imposed by wave action. In order to minimize weight and maintain rigidity of the long poles, the prior art typically utilizes a relatively small diameter center tube with a plurality of longitudinal cable trusses to increase its structural rigidity.

The prior art is functional, but it has a number of drawbacks. Cable trusses are generally unappealing in appearance, create a significant amount of wind noise even at relatively low speeds and require a significant amount of space due to the spreader arms that carry the truss cable guides. Additionally, the cable trusses tend to corrode due to the harsh atmosphere in which they are used and require a considerable amount of maintenance. The different expansion rates of the cable and the pole can create even more problems. A relatively small change in temperature can cause the cable trusses to become loose and allow the pole to bend or become extremely tight and overload the cables or the cable guides.

Accordingly, what is lacking in the art is an aesthetically appealing outrigger that provides controllable thickness and flex characteristics for outrigger sportfishing without the high maintenance, space requirements, and wind noise of the prior art.

SUMMARY OF THE INVENTION

The objectives are accomplished in accordance with the invention by the provision of an improved outrigger assembly constructed with a multi-ply composite tubular structure of fibers and a polymer matrix that is mounted on sport fishing boats for movement between an inboard storage position and an outboard fishing position.

Outriggers of the prior art are almost always straight circular aluminum shafts with cable truss systems to support the extended lengths required for large boats. The instant invention proposes to utilize a judicious selection of materials and cross-sectional geometric shapes to construct superior outriggers that do not require cable truss systems for support. By utilizing the aforementioned materials the thickness and flex characteristics of the outrigger can be tailored and controlled. The combination of utilizing a non-circular cross section, an ellipse for example, allows the bending stiffness in the fore-aft and lateral planes to be tailored individually for optimum outrigger performance. The separate control of the bi-directional bending properties will allow a much higher control of fishing baits during trolling.

In addition, the ability to cost effectively produce an outrigger having a varying non-circular cross section will greatly increase the design flexibility for outriggers and lead to the development of outriggers with higher aerodynamic performance. Composite materials have the ability to be formed into aerodynamically advantageous cross-sectional shapes. For example, ellipse, teardrop, and diamond non-circular shapes reduce wind drag and wind noise normally associated with the current designs.

An essential component of the instant invention is the use of composite materials, more generally, heat curable synthetic resins reinforced with structural fibers. More specifically, the composite materials used in the construction of the outrigger contains a plurality of organic fiber layers, the fibers comprising each layer being oriented at a specific angle depending on the design requirement, and all of these sheets being impregnated with a resin that hardens to form the finished outrigger.

In addition to the structural advantages provided by the composite structure, the ability to form devices such as video or still cameras integrally into the outrigger to capture the fishing action is now attainable. If desired multiple cameras can be integrated into the outrigger, eliminating external mounts and wires while maintaining an aesthetically pleasing appearance.

Accordingly, a primary objective of the instant invention is to teach the use of an outrigger utilizing a multi-ply composite tubular structure of fibers and a polymer matrix that provides an increase in rigidity of the outrigger pole with minimal weight.

Another objective of the instant invention is to teach an outrigger utilizing a multi-ply composite tubular structure of fibers and a polymer matrix having reduced space requirements.

Yet another objective of the instant invention is to teach an outrigger utilizing a multi-ply composite tubular structure of fibers and a polymer matrix having a variable cross-section along its length, e.g. wherein the chord and/or thickness of each tube may change over the length of the tube in order to increase strength at the points of greatest stress while reducing weight.

Still another objective of the instant invention is to teach an outrigger utilizing a multi-ply composite tubular structure of fibers and a polymer matrix wherein the utilization of non-circular cross sections allows the bending stiffness in the fore-aft and lateral planes to be tailored for optimum outrigger performance.

Yet another objective of the instant invention is to teach an outrigger utilizing a multi-ply composite tubular structure of fibers and a polymer matrix wherein the tubes are shaped to provide enhanced aerodynamic performance.

Still yet another objective of the instant invention is to teach an outrigger utilizing a multi-ply composite tubular structure of fibers and a polymer matrix wherein the tubes are shaped to provide a high structural performance.

Still yet another objective of the instant invention is to teach an outrigger utilizing a multi-ply composite tubular structure of fibers and a polymer matrix wherein the outrigger is configured to contain at least one camera.

Other objectives and advantages of this invention will become apparent from the following description taken in conjunction with the accompanying drawings wherein set forth, by way of illustration and example, certain embodiments of this invention. The drawings constitute a part of this specification and include exemplary embodiments of the present invention and illustrate various objectives and features thereof.

DETAILED DESCRIPTION OF THE PREFERRED EMBODIMENT

Figure 1:
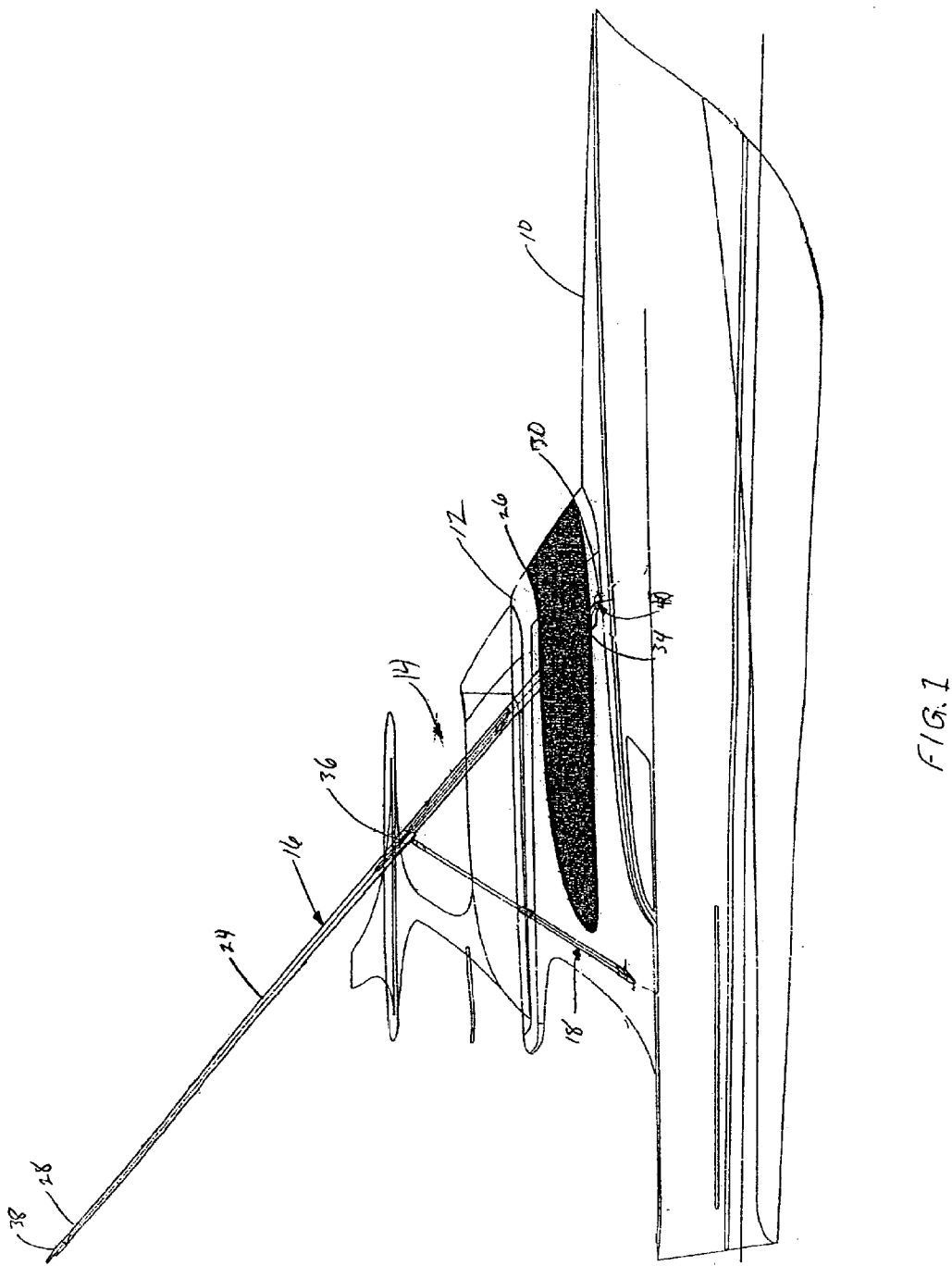
FIG. 1 is a pictorial view illustrating the multi-ply composite outrigger of the instant invention.
Figure 2:
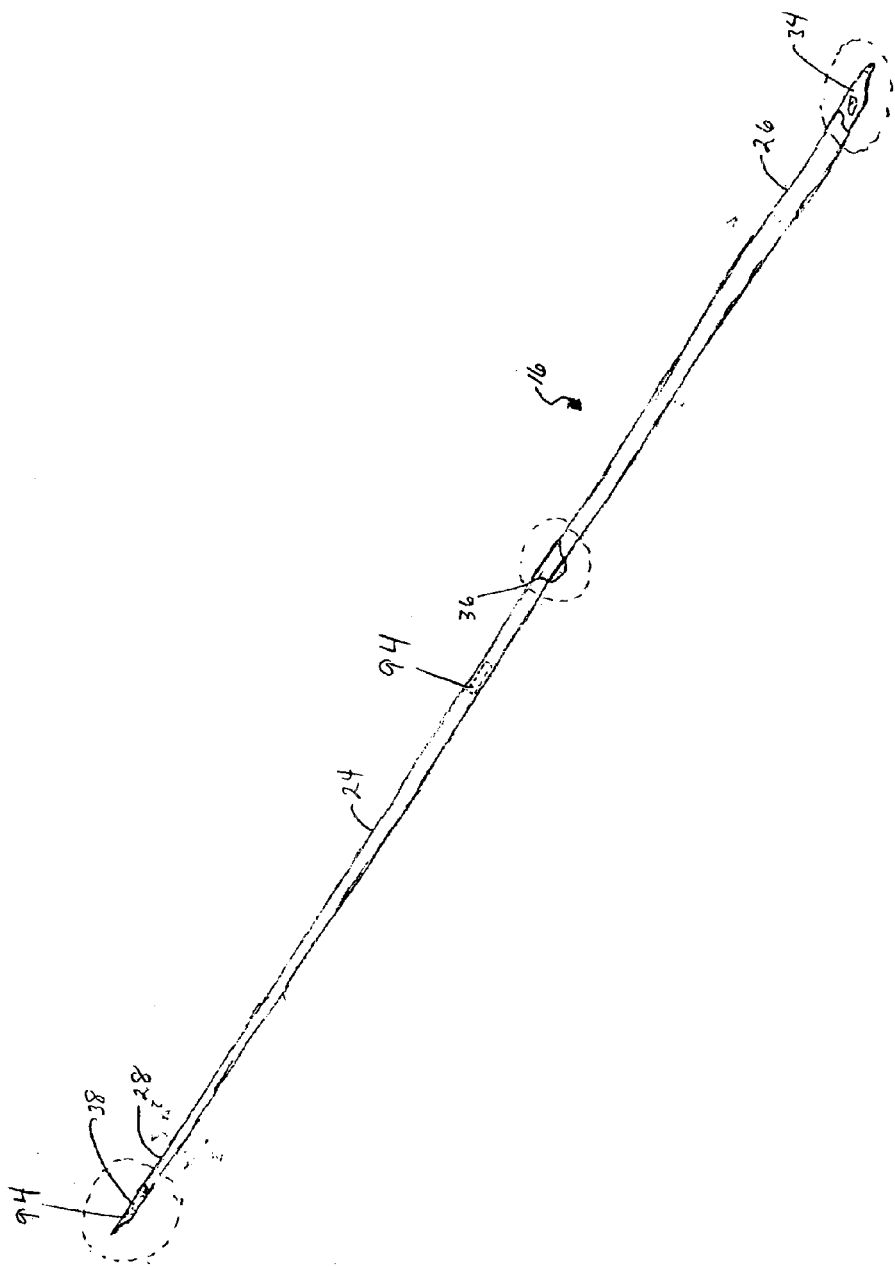
FIG. 2 is a plane side view of the outrigger mast of the instant invention.

Referring now to FIG. 1 set forth is a fishing vessel 10 having a centrally located cabin 12. The outrigger device 14 of the current invention comprises an outrigger mast assembly 16, a layout tube assembly 20, a back tube assembly 18, and a docking tube assembly 22. The docking tube assembly 22 functions generally as a means for maintaining the outrigger mast 24 in a stowed position, while the layout tube assembly 20 and the back tube assembly 18 function generally as a means for maintaining the outrigger mast in a fishing position.

Now referring to FIGS. 2–5, the outrigger mast assembly 16 includes an elongated composite tube 24 having an inboard portion 26 and an outboard end portion 28. Fixedly attached to the inboard end portion 26 of the composite tube 24 is a foot member 34, the foot member 34 being constructed as a conjugate sleeve extending around and gripping at least part of the inboard end portion 26 of the composite tube 24. A typical base member 30 is securely attached to a surface of the boat and constructed to allow the outrigger mast 16 move between a stowage position and a fishing position. A typical universal joint member 32 pivotally secures the inboard end portion 26 of the outrigger mast assembly 16 to the base member 30 via the foot member 34. A conjugate collar member 36 is sized to encircle the outrigger mast tube 24 at a position between the inboard end 26 and the outboard end 28 and fixedly attached to the mast tube 24. The collar member is constructed and arranged to allow releaseable attachment of the back tube assembly 18, the layout tube assembly 20, and the docking tube assembly 22. The tip member 38 is secured to the outboard end 28 of the composite tube 24. The tip member 38 in the preferred embodiment is constructed and arranged to contain a camera 94 as well as for aesthetic appearance and/or aerodynamic purposes. The tip member 38 may be attached to the mast tube 24 by any suitable means well known in the art, but preferably utilizes a conjugate sleeve arrangement.

Figure 3:
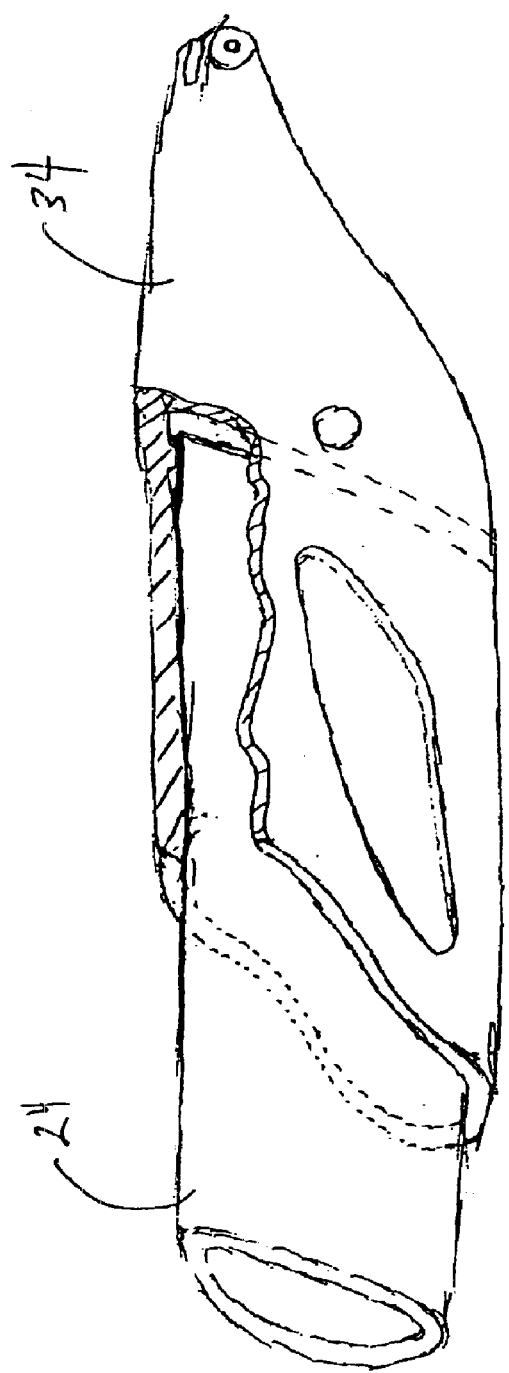
FIG. 3 is an partial isometric view of the foot member of the outrigger mast assembly.
Figure 4:
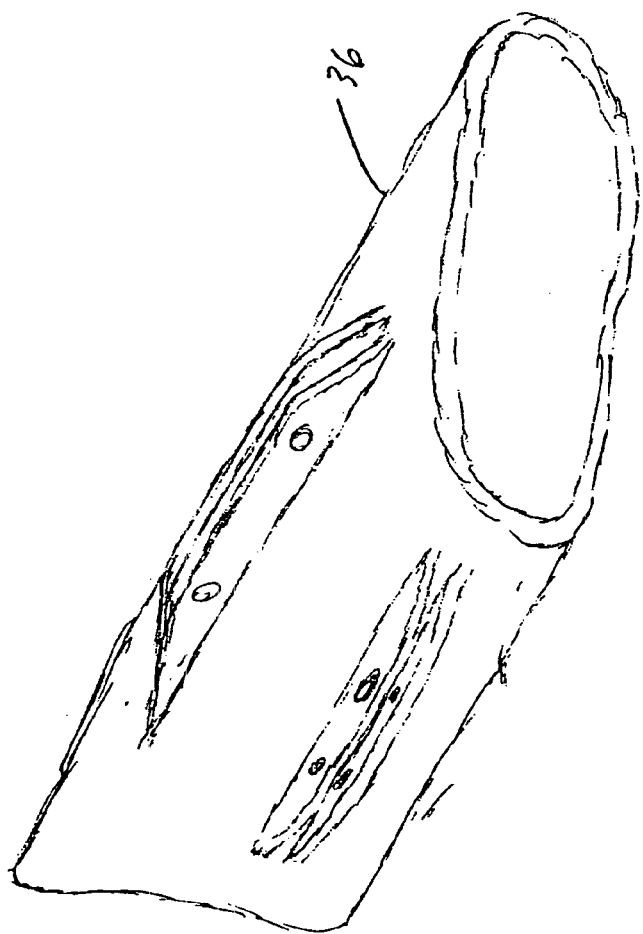
FIG. 4 is an isometric view of the collar member of the outrigger mast assembly.

Now referring to FIG. 3, the conjugate sleeve arrangement of the foot member 34 in relation to the inboard end 26 of the outrigger mast tube 24 is shown. The conjugate sleeve arrangement allows attachment to the sides and/or the ends of the composite tubes thereby providing added strength and rigidity to the outrigger assembly 14. The typical conjugate sleeve arrangement is utilized to attach the foot 34 and tip members to the various tube members throughout the outrigger assembly 14. The conjugate sleeve of the foot member 34 being attached to the inboard end 26 of the mast tube 24 by any suitable means well known in the art, which may include but should not be limited to glueing, bolting, clamping, pinning or the like. It is also understood and anticipated that the foot, tip, and sleeve members could be formed integrally to the outrigger mast tube.

Figure 5:
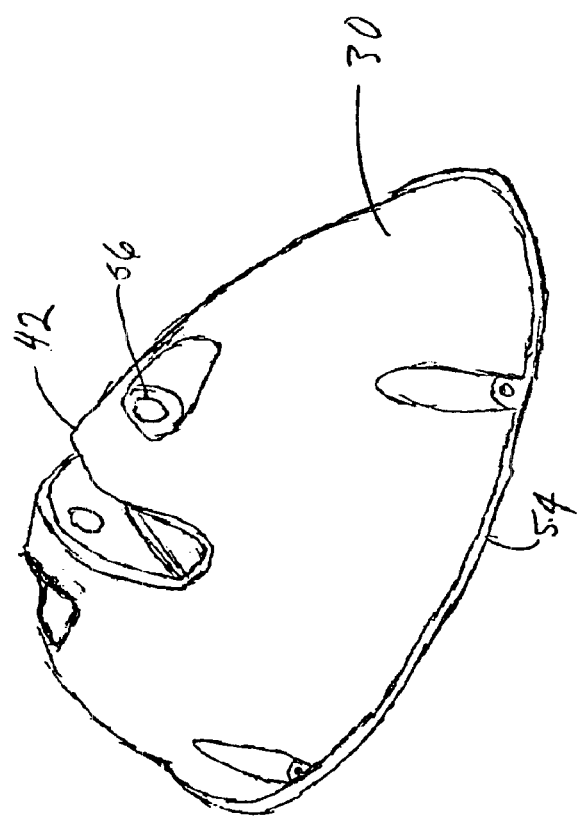
FIG. 5 is an isometric view of the base member.

Now referring to FIG. 5, the base member is illustrated. The base member is constructed and arranged to fixedly cooperate with a surface of the fishing vessel and flexibly cooperate with a tube assembly via a universal joint. The base member is constructed with a generally flat base surface 54. The base surface 54 can be mounted against any generally flat fishing vessel surface using fasteners and/or adhesives that are well known in the art. The base is also provided with a universal joint yoke 42 and a pin bore 56 for cooperation with a central bearing block 32 to provide pivotal movement to the tube assemblies.

Figure 6:
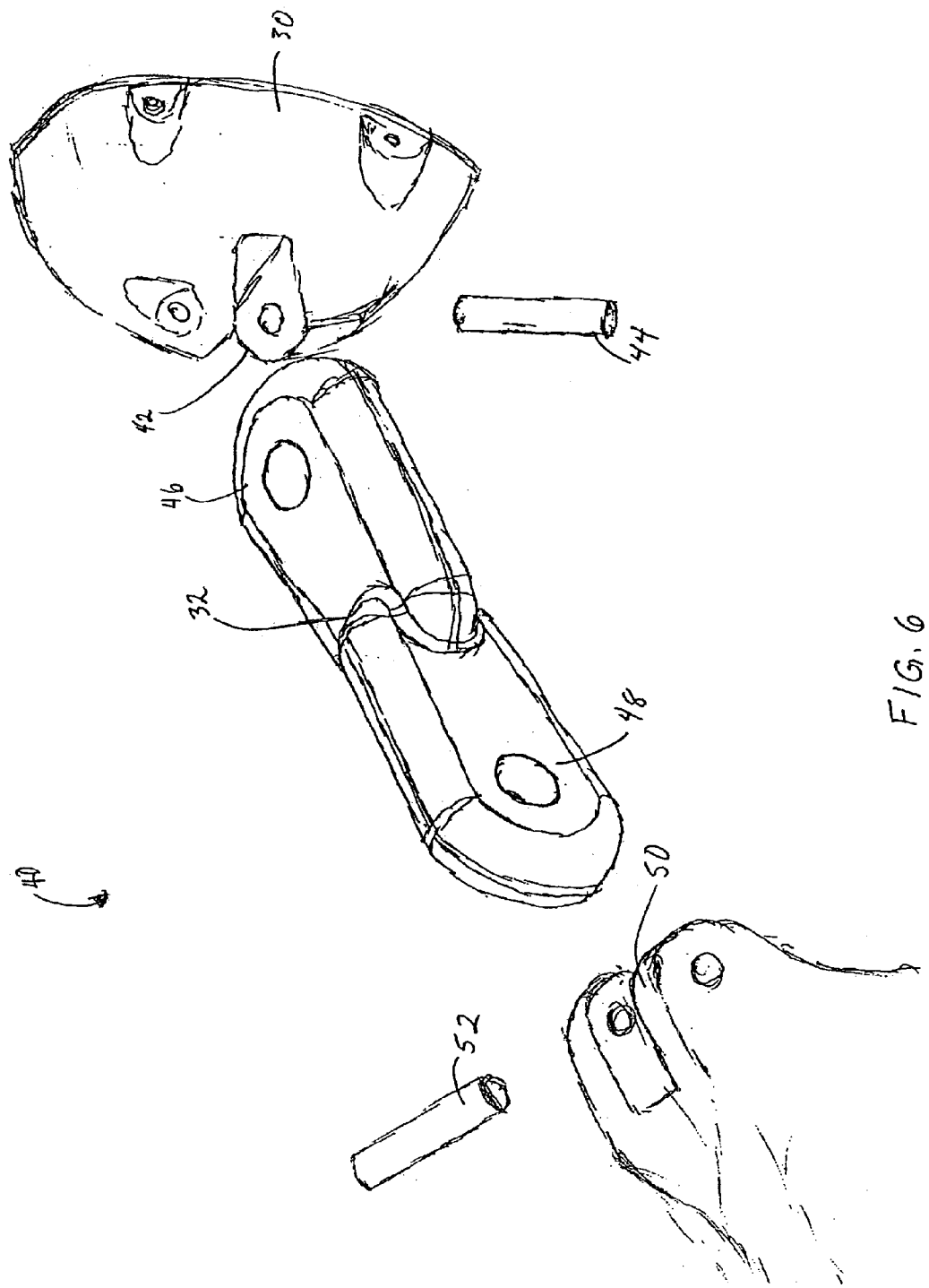
FIG. 6 is an isometric view of the typical universal joint.

Now referring to FIG. 6, the central bearing block member 32 of one of the typical universal joint assemblies 40 is illustrated. The universal joint assembly generally includes two yokes, the central bearing block, and two pins that pass through the central bearing block at right angles. The central bearing block 32 is constructed to allow a first end 46 to cooperate with a base yoke 42 and a first pin 44, while the second end 48 cooperates with a foot yoke 50 and a second pin 52. In this manner the universal joint allows the outrigger tube assemblies to be pivoted between an inboard position and an outboard position. It is also understood and anticipated that other types of universal joints well known to those skilled in the art could be substituted for the universal joint described.

Figure 7:
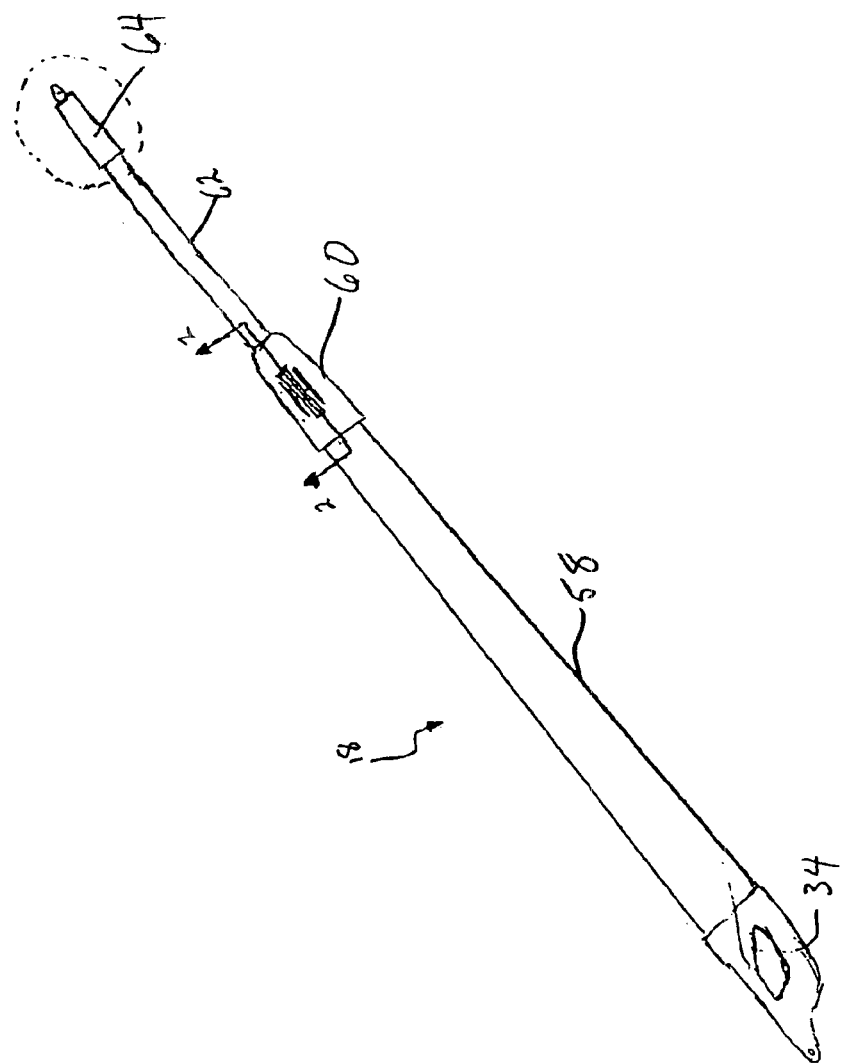
FIG. 7 is a plane side view of the back tube assembly of the instant invention.

Now referring to FIG. 7, the back tube assembly 18 is illustrated. The back tube assembly 18 is constructed and arranged to provide support to the outrigger beam assembly 16 while allowing the outrigger beam in the stowed position to be manually lowered to pass under bridges or other obstructions. The back tube assembly preferably includes an outer composite tube and a telescoping inner composite tube. The outer composite tube 58 includes a foot member 34 cooperating with a base member 30 via a universal joint 40 for pivotal movement and a lock assembly 60 to control telescoping of the inner tube 62. The inner composite tube 62 is constructed to telescope through the lock assembly 60 and into the outer tube 58. In this manner the length of the back tube assembly can be manually adjusted. The head 64 of the inner tube 62 pivotally cooperates with the outrigger beam sleeve 36.

Figure 8:
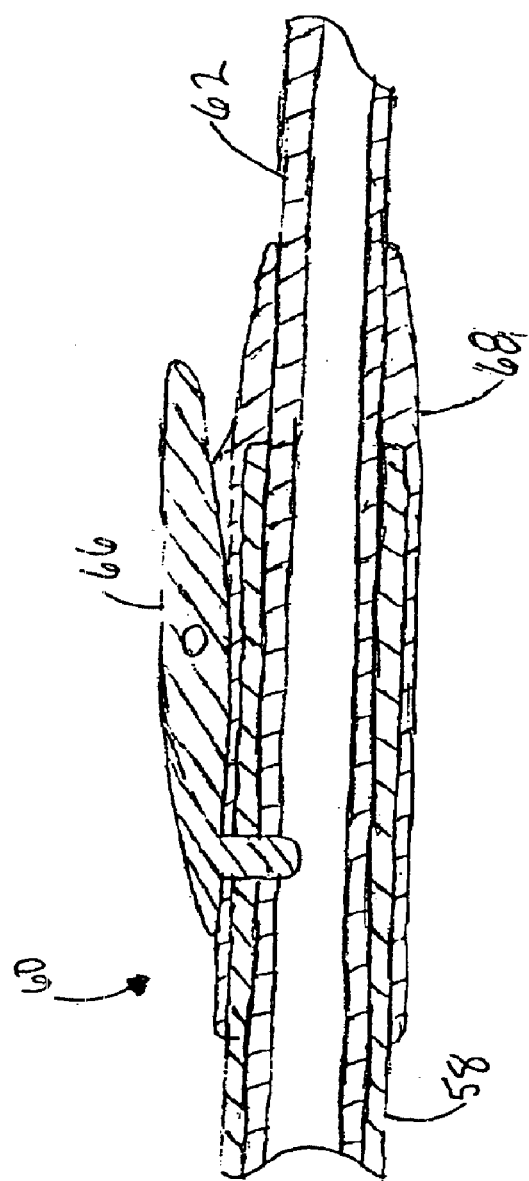
FIG. 8 is a cross sectional view along line 2—2 of FIG. 7 showing the sliding and locking cooperation of the back tube assembly of the present invention.

Now referring to FIG. 8, a section view along lines 2—2 of the lock assembly 60 is illustrated. The lock assembly 60 is constructed and arranged for conjugate sleeve engagement between the lock housing 68 and the outer tube 58 of the back tube 18 assembly; the lock housing 68 being attached to the outer tube 58 by any suitable means well known in the art which may include but should not be limited to glueing, bolting, clamping, pinning or the like. The typical conjugate sleeve arrangement is utilized to attach the lock assemblies 60 to the tube members throughout the outrigger assembly 14. The overlapping arrangement allows attachment to the sides and/or the ends of the composite tubes thereby providing added strength and rigidity to the telescoping back tube assembly 18. The lock release 66 is pivotally attached to the lock housing 68 and preferably biased to the locked position.

Figure 9:
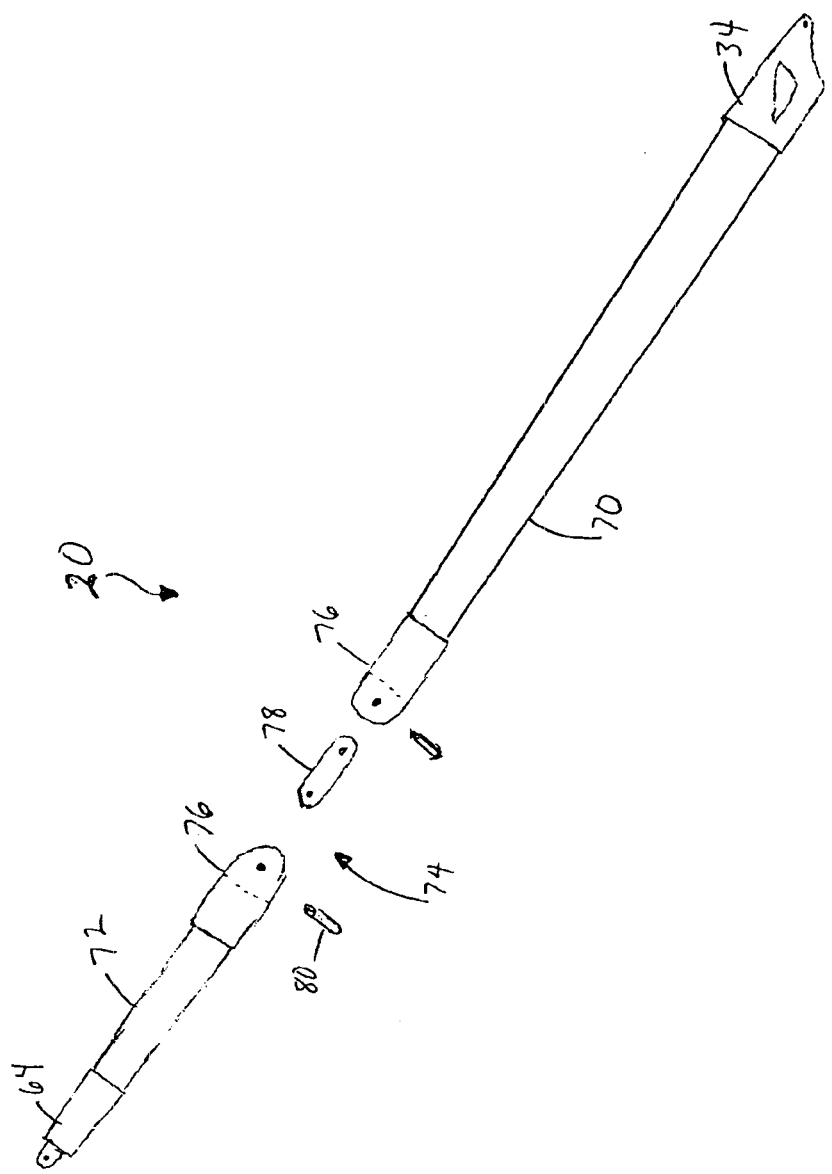
FIG. 9 is an exploded plane side view of the layout tube assembly of the instant invention.

Now referring to FIG. 9, the layout tube assembly 22 is illustrated. The layout tube assembly 20 is constructed and arranged to attach to the fishing vessel via a base member 30 and a universal joint 40 and the foot member 34. The attachment point of the layout tube assembly 22 should be at a point on the fishing vessel 10 above the attachment point of the outrigger mast assembly 16 and the back tube assembly 18. The layout tube assembly 22 includes a first tube 70, a second tube 72, and an elbow joint 74 that allows the layout tube 22 to fold when the outrigger assembly 14 is in the stowed position and straighten when the outrigger assembly 14 is in the fishing position. The elbow 74 includes two yokes 76, a bar joint 78, and a pair of pivot pins 80 that cooperate to allow the elbow to pivot about 180° in either direction.

Figure 10:
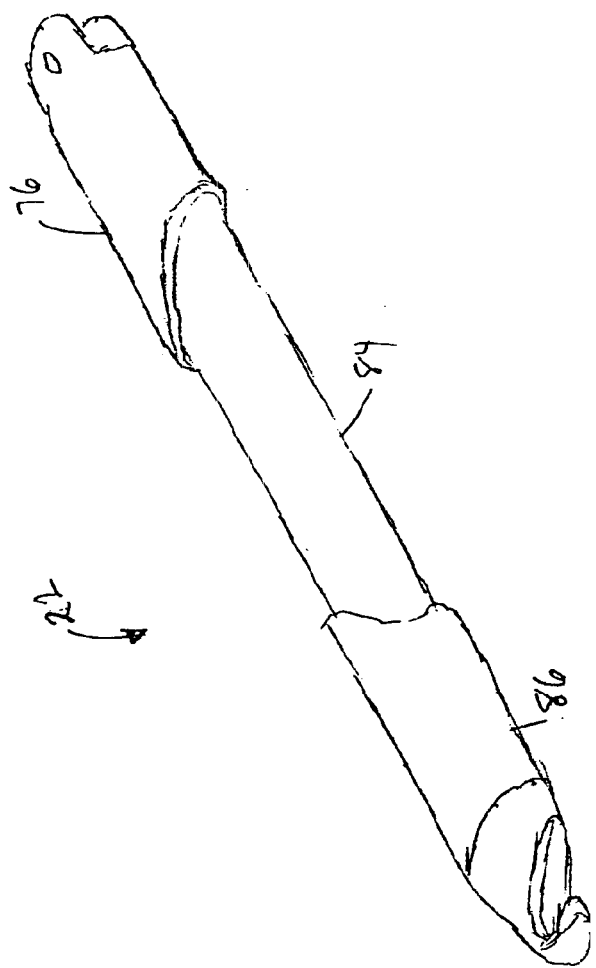
FIG. 10 is an isometric view of the layout tube assembly.

Now referring to FIG. 10, the docking tube assembly 22 is illustrated. The docking tube assembly 22 includes a composite tube member 84, a hook member 86, and a yoke member 76. The docking hook assembly is constructed and arranged to attach to the fishing vessel 10 via, a base member 30, a universal joint 40, and the yoke member 76. The docking hook assembly releasably engages the collar member 36 of the outrigger beam 24 to hold the outrigger assembly 14 in the stowed position. Disengaging the docking hook assembly 22 from the collar 36 allows the outrigger assembly 14 to pivot into the fishing position.

Figure 11:
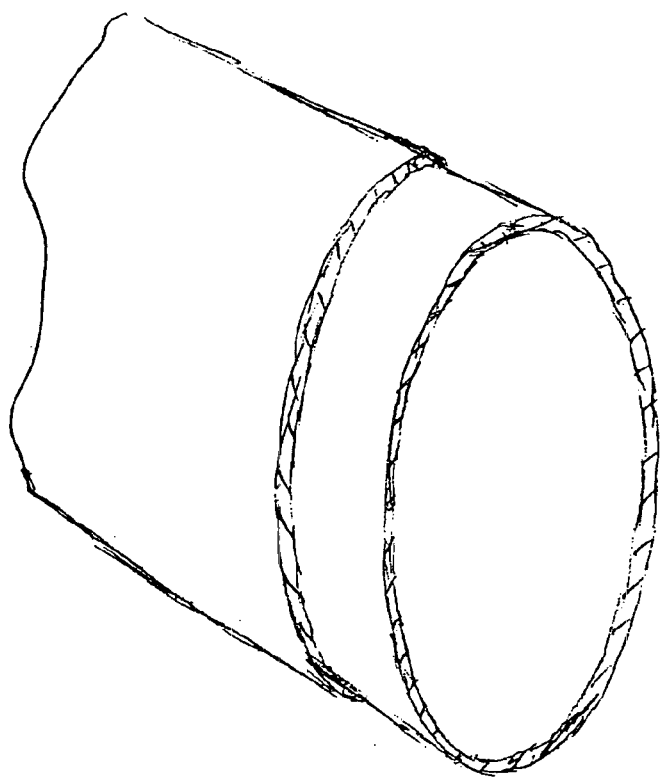
FIG. 11 is an isometric section view illustrating the preferred shape and multi-layer composite construction of the tubular members of the instant invention.
Figure 12:
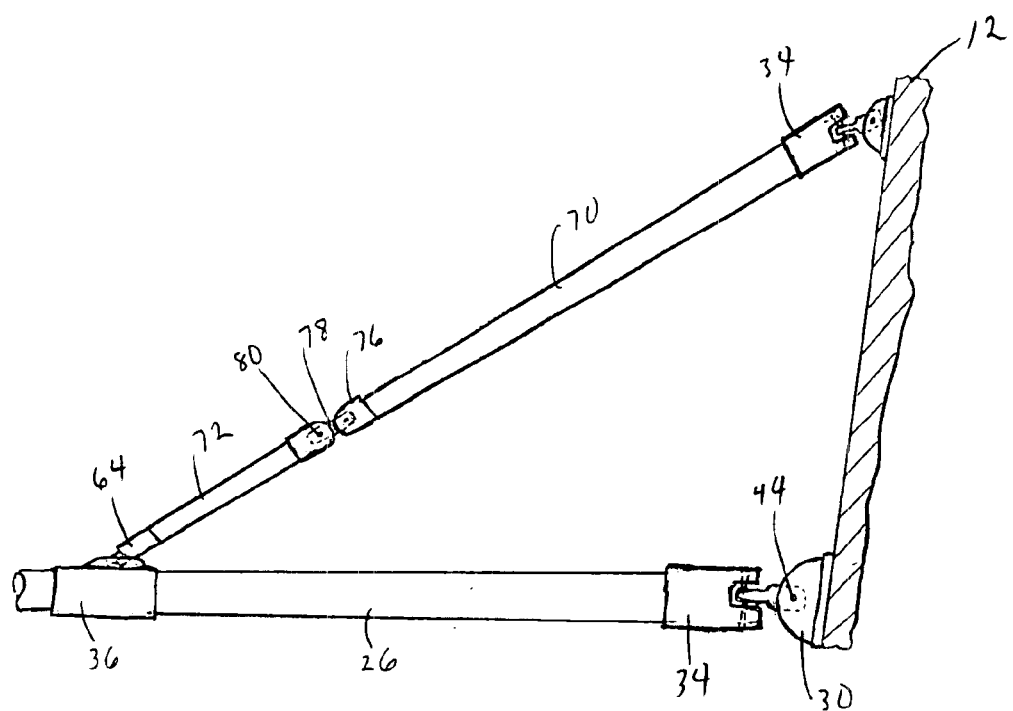
FIG. 12 is a partial front view of the outrigger device of the instant invention in a fishing position illustrating the cooperation between the layout tube assembly, the mast assembly and the fishing vessel.
Figure 13:
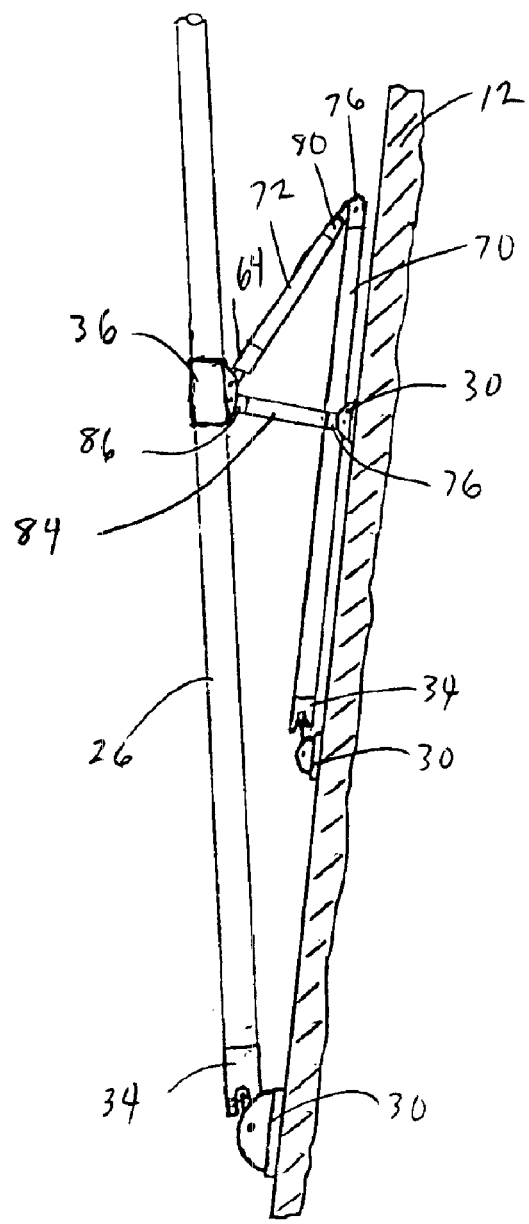
FIG. 13 is a partial front view of the outrigger device of the instant invention in a stowed position illustrating the cooperation between the docking tube assembly, the mast assembly and the fishing vessel.

Now referring to FIG. 11, the composite tube construction utilized throughout the preferred embodiment is illustrated. The tubes 24, 58, 62, 70, 72 and 84 are generally elliptical shaped multi-ply composite tubular components 92 of fibers and a polymer matrix. The benefits of carbon and other high modulus fiber reinforcements, i.e. high strength and low weight, are well known. The composite materials used are generally heat curable synthetic resins reinforced with structural fibers. More specifically, the composite material used in construction of the tubes contains a plurality of organic fiber layers 90, the fibers composing each layer being oriented at a specific angle depending on the design requirement, and all of the layers being impregnated with a resin which hardens to form a finished tubular component 92.

The composite tubular construction allows the tubes to be tailored to a particular need. The tubes can be constructed with a generally constant thickness and diameter over their length, for example tube 62 (FIG. 7) and tube 84 (FIG. 10), or they can be constructed with varying thickness and diameter over their length to provide strength to the areas of the greatest stress concentration, for example tubes 24, 58, 62, 70, 72 and 84 (FIGS. 1, 2, 7 and 9). In a preferred embodiment the outrigger pole 24 is constructed thicker and wider at the inboard end 26 than at the middle and outboard end 28. As will be understood by those skilled in the art the fibers may be woven, wrapped, or layered into the polymer matrix directionally or randomly to provide different flexion characteristics to the tubes. This construction also allows numerous different cross sectional shapes to be constructed which may include but should not be limited to round, square, rectangle, ellipse, teardrop, and diamond.

In addition to the structural advantages provided by the composite structure, the ability to form devices such as video or still cameras integrally into the outrigger mast assembly 16 to capture the fishing action is now attainable. If desired multiple cameras 94 can be integrated into the outrigger mast assembly 16, eliminating external mounts and wires while maintaining an aesthetically pleasing appearance. For storage of the captured videos and/or still photos, storage means well known in the art (not shown) may be contained within the fishing vessel 10.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

We claim:

1. A multi-ply composite outrigger device for use on a fishing vessel comprising:

an outrigger mast assembly defined by an elongated composite tubular member having a first inboard end portion, a second outboard end portion and a conjugate collar member, said collar member sized to encircle said outrigger mast, said outrigger mast extending through said collar member and rigidly affixed thereto, said collar member constructed and arranged for attaching a back tube assembly and a layout tube assembly, wherein, said elongated composite tubular member has a larger cross-section at said first inboard end portion than at said second outboard end portion, wherein said cross-section tapers progressively between said first inboard end portion and said second outboard end;

a first base member assembly secured to said fishing vessel, said first base member constructed and arranged to allow said outrigger mast to move between a stowage position and a fishing position;

a first universal joint member for securing said inboard end portion of said outrigger mast assembly to said base member assembly;

a layout tube assembly, said layout tube assembly including a first tube having a first end constructed and arranged for pivotal attachment to a second base member and a second end constructed and arranged for pivotal attachment to the first end of a bar joint via a pivot pin, a second tube having a first end constructed and arranged for attachment to a second end of said bar joint via a pivot pin and a second end constructed and arranged for pivotable attachment to said collar member, wherein said bar joint allows said second tube to pivot to a position juxtaposed to said first tube when said mast assembly is in said stowage position and straighten out when said mast assembly is in said fishing position;

a second base member assembly secured to said fishing vessel, said second base member constructed and arranged to allow said layout tube assembly to move between a stowage position and a fishing position;

a second universal joint member for securing said first end portion of said layout tube assembly to said second base member assembly;

a back tube assembly, including a first outer composite tubular member having a first end portion and a second end portion;

a second inner tubular member having a first end portion and a second end portion, said second inner tubular member in telescoping engagement with said first outer composite tubular member;

a lock assembly constructed and arranged as a conjugate sleeve for securement to said second end portion of said first outer composite tubular member, said lock assembly constructed and arranged for releaseable engagement with said second composite tubular member;

a third base member assembly secured to said fishing vessel, said third base member assembly constructed and arranged to allow said back tube assembly to move between a stowage position and a fishing position;

wherein rotation of said outrigger mast assembly between a stowage position and a fishing position is facilitated, wherein said telescoping back tube assembly facilitates lowering of said mast assembly when in said stowage position.

2. The outrigger device according to claim 1, wherein said outrigger device includes a docking tube for securing said outrigger mast in said stowed position, said docking tube including an elongated multi-ply composite tubular member having a first end and a second end, said first end constructed and arranged for attachment to said fishing vessel, said second end constructed and arranged for attachment to said collar member.

3. The outrigger device according to claim 1, wherein said docking tube includes a first docking hook constructed and arranged as a conjugate sleeve for securement to said first end of said elongated composite tubular member and a second docking hook constructed and arranged as a conjugate sleeve for securement to said second end of said elongated composite tubular member.

4. The outrigger device according to claim 1 wherein, said elongated multi-ply composite tubular members are constructed with a wall thickness that may change over the length of said elongated tubular members, whereby increased strength is achieved at points of greatest stress.

5. The outrigger device according to claim 1 wherein, said elongated tubular members of said layout tube and said back tube assemblies have a larger cross-section at said first end portions than at said second end portions, wherein said cross-section tapers progressively between said first inboard end portion and said second outboard end.

6. The outrigger device according to claim 1 wherein, said outrigger mast assembly includes a foot member constructed and arranged as a conjugate sleeve for securement to said first inboard end of said elongated composite tubular member.

7. The outrigger device according to claim 1 wherein, said layout tube assembly includes a foot member constructed and arranged as a conjugate sleeve for securement to said first end of said elongated composite tubular member.

8. The outrigger device according to claim 1 wherein, said back tube assembly includes a foot member constructed and arranged as a conjugate sleeve for securement to said first end of said elongated composite tubular member.

9. The outrigger device according to claim 1 wherein, said outrigger mast assembly includes at least one camera integrated into to said elongated composite tube member;

wherein said at least one camera is in electronic communication with a storage means for storing electronic data from said at least one camera, said storage device secured within said fishing vessel.

10. The outrigger device according to claim 1 wherein, said outrigger mast assembly includes at least one camera integrated into said elongated composite tube member at about said outboard end and at least one camera integrated at about said midpoint of said elongated tube member;

wherein said cameras are in electronic communication with a storage means for storing electronic date from said cameras, said storage device secured within said fishing vessel.

11. The outrigger device according to claim 1, wherein said elongated multi-ply composite tubular member of said mast assembly includes at least one inner ply composite structure of fibers in a polymer matrix and at least one outer ply composite structure of fibers in a polymer matrix.

12. The outrigger device according to claim 11, wherein said inner and said outer plies of fiber extend in different circumferential directions.

13. The outrigger device according to claim 11, wherein said fibers are carbon fibers and wherein said polymer matrix is heat curable.

* * * * *